United States Patent [19]

Silverman

[11] Patent Number: 5,508,699
[45] Date of Patent: Apr. 16, 1996

[54] IDENTIFIER/LOCATOR DEVICE FOR VISUALLY IMPAIRED

[76] Inventor: Hildy S. Silverman, 4 Lowe Rd., Somerville, N.J. 08876

[21] Appl. No.: 328,462

[22] Filed: Oct. 25, 1994

[51] Int. Cl.⁶ .................................................. G08G 1/095
[52] U.S. Cl. .................. 340/944; 340/539; 340/407.1; 340/825.19; 340/825.49; 434/112; 434/116; 342/24
[58] Field of Search ................. 340/539, 407.1, 340/325.19, 944, 539, 947, 954, 958, 825.49; 381/68.1, 92; 434/112, 116; 367/99, 118, 124; 342/24

[56] References Cited

U.S. PATENT DOCUMENTS

| | | | |
|---|---|---|---|
| 3,993,407 | 11/1976 | Moricca et al. | 340/407 |
| 4,025,922 | 4/1977 | Trawick, III | 340/944 |
| 4,253,083 | 2/1981 | Imamura | 340/944 |
| 4,660,022 | 4/1987 | Osaka | 340/407 |
| 4,682,159 | 7/1987 | Davison | 340/825.19 |
| 4,935,907 | 7/1990 | Friedman | 367/118 |
| 5,032,836 | 7/1991 | Ono et al. | 340/825.71 |
| 5,144,294 | 9/1992 | Alonzi et al. | 340/825.49 |
| 5,241,307 | 8/1993 | Bidault et al. | 340/944 |
| 5,374,924 | 12/1994 | McKiel, Jr. | 340/825.19 |

FOREIGN PATENT DOCUMENTS

| | | | |
|---|---|---|---|
| 4222126 | 8/1992 | Japan | 340/944 |

*Primary Examiner*—Donnie L. Crosland
*Attorney, Agent, or Firm*—Kenneth P. Glynn

[57] ABSTRACT

The present invention is a locator device for the visually impaired including a transmitter and a dual sensing system having a receiver with earphones which are attached to opposite sides of a unit worn on the user's head. The sensing system is capable of determining a direction and distance of the signal, and capable of producing first and second audible notifiers in each of the earphones. The notifier produced in each earphone is different and is associated with the direction and distance of the transmitted signal. When the notifier produced in each earphone is the same, the user is directly in front of the desired object to be located.

20 Claims, 4 Drawing Sheets

IDENTIFIER/LOCATOR DEVICE FOR VISUALLY IMPAIRED

BACKGROUND OF THE INVENTION

1. Field of the Invention

The present invention is directed to a bineural dual sensing system for guiding the blind including a transmitter unit for transmitting inaudible signals and a corresponding receiver with earphones which are attached to respective side portions of a unit to be worn by a user. The receiver senses the transmitted signal and processes it at a specified tone and/or volume dependent upon the angle and distance of reception.

2. Information Disclosure Statement

Transmission of information by sound is known in the art of object recognition. The following represents the state of the art.

U.S. Pat. No. 5,241,307 to Bidault et al. discloses a sound signaling and optical signaling system utilized at a crosswalk. The depression of a button for a predetermined amount of time alerts the user with a sound message, as well as with an optical message using green and red figurines. The generation of the sound signal is controlled by a microprocessor.

U.S. Pat. No. 5,144,294 to Alonzi et al. discloses an apparatus for aiding the blind comprising a portable, radio frequency transceiver and a stationary, radio frequency base transceiver unit. The transceiver is carried by the individual and transmits a message request signal in response to manual activation of a transmit button.

U.S. Pat. No. 5,032,836 to Ono et al. teaches a portable guide device for the visually handicapped including a radio frequency signal oscillator. The position indicator unit is disposed at a desired place and includes a radio frequency signal receiver and a loud speaker.

U.S. Pat. No. 4,935,907 to Friedman discloses a homing system for directing the user to a specified location comprising a plurality of remote modules and a mobile module.

U.S. Pat. No. 4,660,022 to Osaka discloses a system for guiding the blind including at least one receiver/sound generator unit having a built-in sound generator giving information on the destination of the user, a receiver for actuating the sound generator in accordance with a control signal coming from outside, and a transmitter/control unit carried by the user for producing the control signal.

U.S. Pat. No. 4,253,083 to Imamura discloses a traffic signal system for the blind having a sound system generator electrically connected to a blue light of the traffic signal device which generates a signal representative of sound synchronous with the lighting of the blue light.

U.S. Pat. No. 4,025,922 to Trawick, III discloses a traffic control system including an interrogating FM radio transmitter-receiving unit, which can be incorporated into a cane, and a responding FM radio receiver transmitter unit operatively associated with the traffic signal light control circuit at a street intersection.

U.S. Pat. No. 3,993,407 to Moricca et al. teaches a polysensory mobility aid comprising first and second signal generating means which produce audio frequency signals coupled to respective electrically operable stimulating devices for providing both tactile and auditory stimulation. Each of the signal generating means includes two camera means that generate signals representative of the brightness of optical images projected thereon.

Notwithstanding the prior art which teaches numerous variations on the idea of sound transmission and sensing to aid the visually impaired, the prior art fails to teach the system of the present invention which involves a dual sensing system for receiving a transmitted signal and processing it such that information regarding the identification and location of an object is relayed.

SUMMARY OF THE INVENTION

The present invention is an identifier/locator device for the visually impaired comprising a dual sensing system having a transmitter which can be attached to a variety of objects, including a bathroom door, traffic signal, radio, and the like, and a receiver with earphones which are attached to opposite sides of a unit worn by the user. The sensing system further includes means for determining a direction and distance of the signal, and means for producing a first and second audible notifier in each of the receiving system's earphones. The audible notifier produced in each earphone may be different, and is associated with the direction and distance of the transmitted signal. When the user is directly facing the desired object to be located, a characteristic notifier is conveyed.

The dual sensing system in an alternative embodiment comprises two separate receivers attached to opposite sides of the unit.

BRIEF DESCRIPTION OF THE DRAWINGS

The present invention is more fully understood when the instant specification is taken in conjunction with the drawings which are appended hereto, wherein:

FIG. 6b shows a perspective view of the receiver unit of FIG. 6a; and

DETAILED DESCRIPTION OF THE PRESENT INVENTION

The present invention involves an identifier/locator device for the visually impaired comprising a dual sensing system having a transmitter and a receiver. Thus, it is an object of the present invention to develop a system that allows a user to identify and locate an object by inaudible signal transmission.

The identifier/locator device may be used in a variety of settings including the home attached to various appliances, and in public buildings on bathroom doors, elevators, or on traffic signals, and the like. The device may assume a variety of embodiments to identify and locate a desired object, including well known electronic components, a variety of attachment units for housing the receiver, and an array of inaudible signal transmission methods over a variety of mediums, including but not limited to electromagnetic waves, wires and air.

Figure 1:
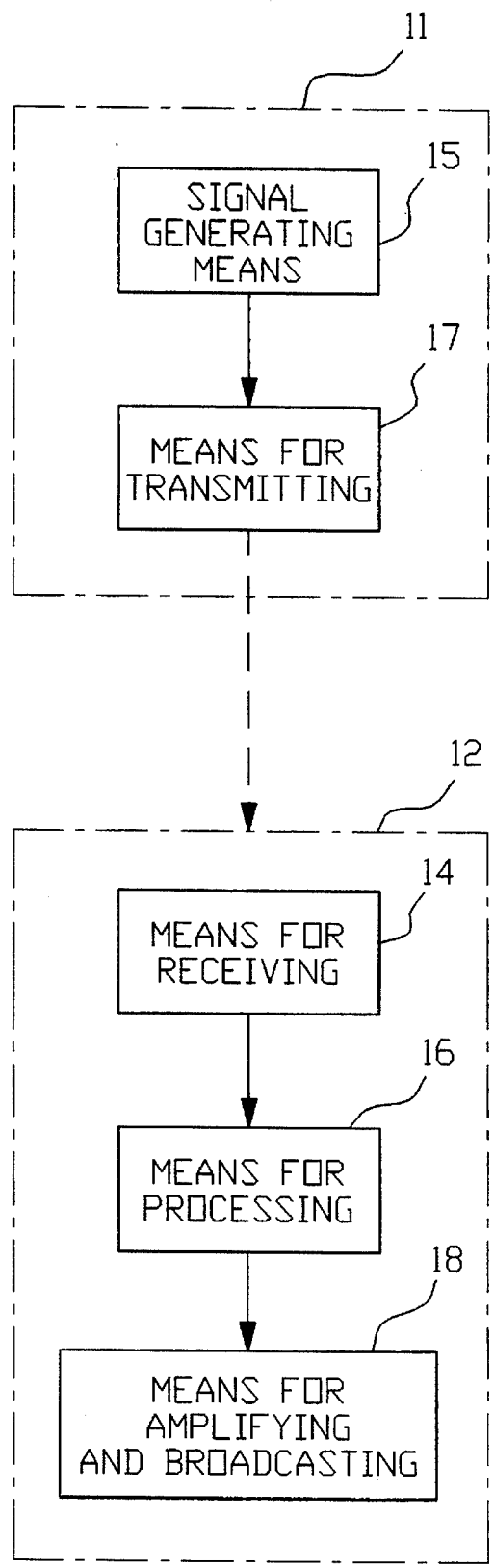
FIG. 1 shows a schematic of the dual sensing system of the present invention.
Figure 2:
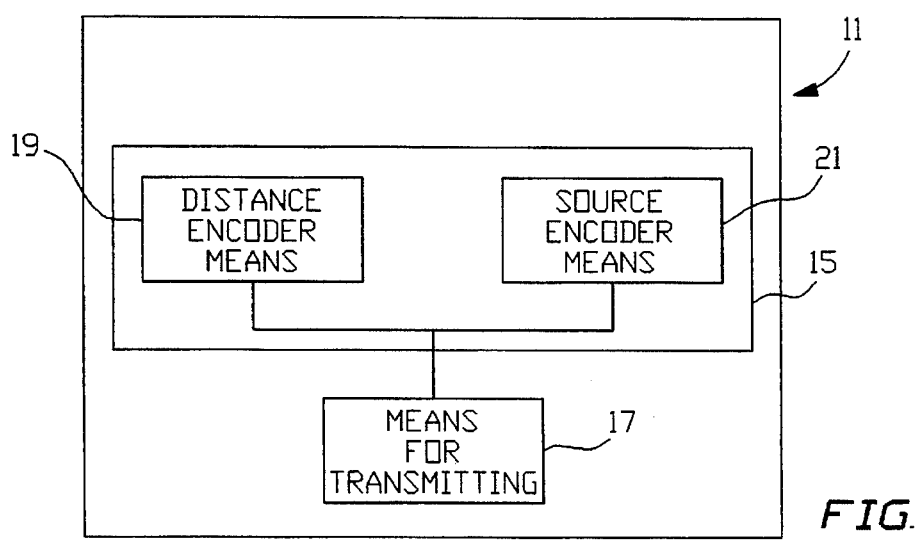
FIG. 2 shows a schematic of the transmitting unit of FIG. 1.
Figure 3:
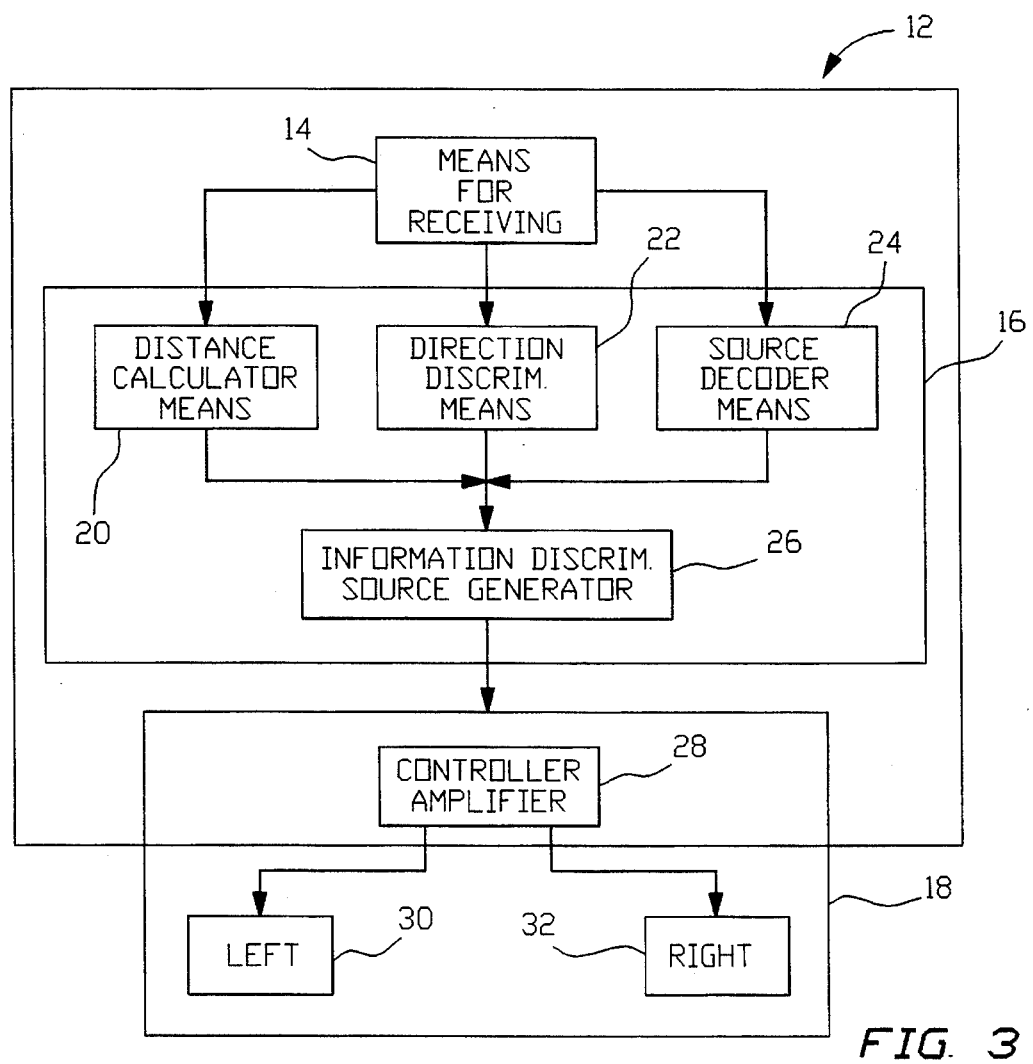
FIG. 3 shows a schematic of the receiving/unit of FIG. 1.

Referring now to FIGS. 1–3, there is shown a schematic of the system of the present invention including a transmitting unit 11 and a receiving unit 12. The transmitting unit 11, as shown in FIGS. 1 and 2, includes signal generating means 15 attached to means for transmitting 17. The signal generating means 15 comprises means for encoding distance information 19, and means for generating a coded message 21. This information is generated as one signal which is transmitted via the means for transmitting 17. The means for transmitting 17 includes any well known type of carrier component, i.e. RF modulators, piezoelectric crystals.

The means for encoding distance information 19 can be an originating signal strength indicator, which may operate by generating the power associated with the strength of the originating signal.

Thus, the signal emitted may be a radio wave of a predetermined frequency, an ultrasonic wave, or the like, capable of carrying an encoded tone pattern characteristic to the object, in addition to information pertaining to the originating signal strength.

Any type of well known means for supplying power (not shown) can be connected to the signal generating means 15 to allow the device to be readily operable when attached to a desired object.

Referring now to FIGS. 1 and 3, there is a shown a receiving unit 12. The receiving unit 12 is provided with three components, including means for receiving the signal 14, means for processing the signal 16 and means for amplifying and broadcasting the signal 18. The means for receiving the signal 14 comprises components that are well known in the art for receiving and separating a signal from its carrier. These components may include antennas, demodulators, piezoelectric transducers, and the like.

The means for processing the signal 16 is further comprised of four components and encompasses a large portion of the present invention. These components include distance calculator means 20, direction discriminator means 22, source decoder means 24 and an information discriminator/ source generator 26.

The distance calculator means 20 handles the portion of the signal pertaining to the originating signal strength. The distance calculator means 20 is capable of determining the distance between the transmitter/object 11 and the receiver/ user 12 based on the difference in power intensity between the originating signal and the received signal. Once this calculation is performed, the information is sent to the information discriminator/signal generator 26. A second component of the means for processing the signal 16, the direction discriminator means 22, operates as a sensor that is capable of determining from which direction the signal is coming. Sensors for determining direction and location are well known in the art. For example, radio directional finders (RDF) for navigation operate in this fashion. However, it should be understood that this function as described above could be performed using a plurality of other electronic components well known in the art. This information is also sent to the information discriminator/signal generator 26.

A third component of the means for processing the signal 26, the source decoder means 24, handles that portion of the signal that contains coded information. The information is decoded by any type of standard decoder and sent to the information discriminator/signal generator 26.

The information discriminator/signal generator 26 evaluates the information sent to it by the distance calculator means 20, direction discriminator means 22 and source decoder means 24, and generates a source signal. The source signal is translated to an audible notifier pertaining to the distance information, direction information and message information. (The audible notifier may be a tone, message or combinations thereof.) Before the source signal is translated to an audible notifier, it is first compared with a list of predetermined priorities programmed into the information discriminator/source generator as now discussed.

A user of the device of the present invention will be hearing many signals simultaneously, some pertinent to the user and some irrelevant. Thus, it is an important feature of the means for processing the predetermined information 16 to include a programmed component containing a priority list of this predetermined information to which the information from the signal is compared. This feature is established in the information discriminator 26 using a microprocessing chip with a default mechanism, or other such component, that contains information specific to the user, i.e. male or female; preference for elevators or stairs. In this manner, only the pertinent information is prioritized and conveyed to the user. The chip could be placed in a PC installation program, for example, and programmed accordingly. The programmed means would be programmed to exclude information rather than to include it, as a matter or efficiency and assuring that less important objects would not be overlooked.

Other such information that may be programmed in the information discriminator 26 is information pertaining to the signal type— whether inclusive or exclusive. When inclusive signals are received simultaneously, the signals will be played serially, one after the other in order of prioritized or predetermined importance, such as in a setting where the user is receiving a signal from an elevator and an emergency exit. However, in the case where the signals are exclusive, all signals except the signal which is most directly ahead will be ignored. This feature is helpful in a setting where a user approaches an intersection with cross-walk signals from each corner being transmitted. These signals would be categorized as exclusive, and only the signal which is most directly ahead of the user will be sounded.

Alternatively, the inclusive/exclusive information could be transmitted with the signal and be merely processed by the receiver.

Once a notifier is generated by the information discriminator/signal generator 26, it proceeds to the means for amplifying and broadcasting 18. The means for amplifying and broadcasting 18 splits the notifier accordingly into first and second notifiers, amplifies them, and broadcasts them through any well known information destination means 30, 32, which may be respective ear pieces of a headset, respective side portions of a pair of glasses, or other earphone means as described herein. The broadcast notifier may be a word, or several words, a code, a tone, or all of the above.

The following are example signals that can be conveyed by the transmitting unit: "emergency exit, 10 {-, -, -, 10}" or "elevator phone, 1 {-,--, -, 1}". For operation, the codes for the respective units, their signal strengths, and the signal strengths themselves must be standardized throughout the industry. Thus, the translated information may form words that are sounded such as "women's room", "elevator", "don't walk", or other specified information pertaining to the code of the word, such as the actual distance from the object.

The audible notifier in each respective ear piece will be different in tone, pitch or volume unless the user is directly facing the transmitter/object, and will intensify in volume or frequency as the user approaches the object.

The transmitting and receiving units 11, 12 can include an array of electronic components well known in the art for performing these functions, including carrier frequency oscillators/piezoelectric transducers, modulators/demodulators, microprocessing chips, encoders/decoders, and signal strength indicators/detectors.

In the case of RF transmission, the particular frequency selected for the oscillator can be of a number of bands, subject to regulation by the FCC (in the United States).

Now, in the case where information, such as whether the signal is being categorized as inclusive or exclusive, is merely processed by the receiver and not prioritized, the transmitter would need to send encoded information. The information could be encoded in the transmitter and translated by utilizing a decoder, or other such processor, at the receiving end.

In operation, the device of the present invention could be utilized in several manners. For instance, a user of the present invention trying to locate an elevator might hear a an audible notifier, i.e. a characteristic tone, (which may also have a stronger volume) in the left earphone, different than in the right. The user recognizes this tone pattern and realizes that the elevator is located more toward his left and subsequently rotates his body to the left, until the tone is similar in both earphones, indicating that the user is directly facing the elevator. Upon approaching the elevator, the tone could get stronger indicating that the user is very close in distance to the elevator. In addition, the transmitter unit located on the elevator could send out an inaudible code through the source encoder that when received by the receiver unit would be transcribed to sound the word "elevator, 5 feet" in both earphones.

Further, a second transmitter could be located on the inside of the elevator, such that when the user is inside, a message stating the floor number could be transmitted as "first floor, second floor", etc. through the earphones. To accomplish this, the transmitter could be connected to the elevator's floor indicating device. Thus, both information regarding location, and a specified message can be conveyed with the device of the present invention.

The transmitter could also have additional features including a switch having a tone only option, message only option or both a tone and message option. The receiver could have a plurality of microprocessing chips for recognizing and producing the tones and messages associated with the signals and codes. Further, the transmitter could transmit the signals in a range of frequencies and may be transistorized and battery-operated so as to be compact, as well as light.

In general, the receiving unit is coordinated with the transmitting unit such that the receiver is capable of accepting the type of signal sent, whether it be RF, ultrasonic, or other inaudible type signal, and its associated frequency.

Figure 4:
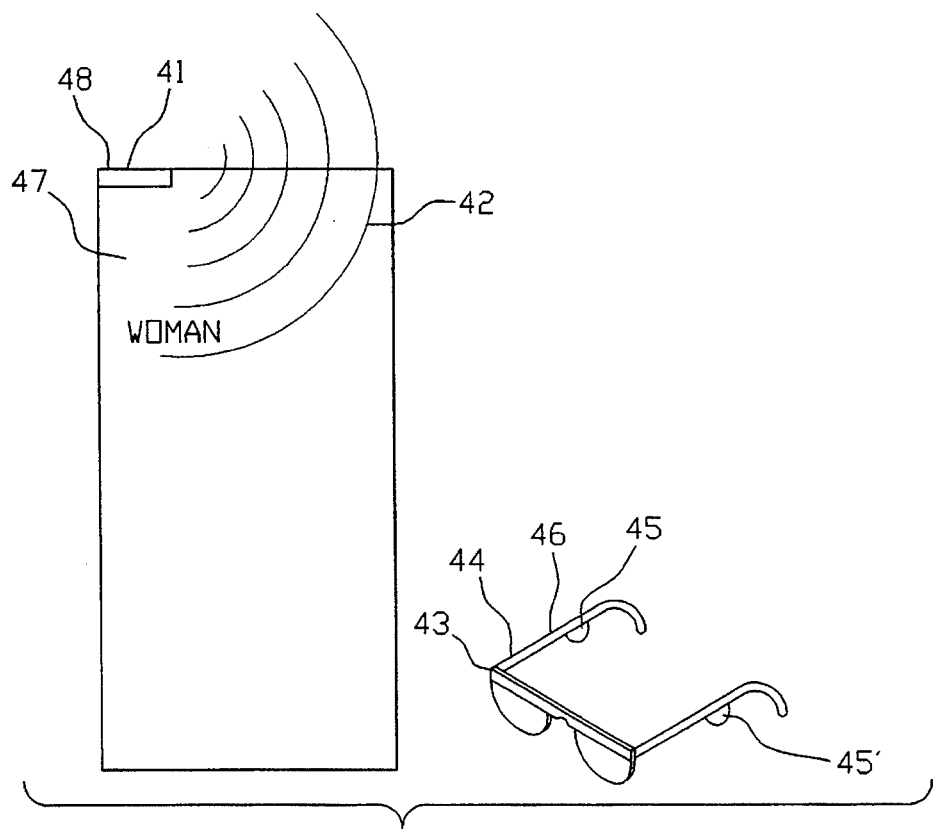
FIG. 4 shows a plan view of one embodiment of the present invention.

Referring now to FIG. 4, there is shown one embodiment of the device of the present invention in which a transmitter 41 is mounted using adhesive 48, VELCRO, hook and loop type fasteners, screws, rivets, or the like, to a desired object to be located, such as a bathroom door 47. The transmitter sends out an inaudible signal 42 which is received by the receiver 43. In this embodiment, the receiver 43 is located on a pair of specially designed glasses 46. The receiver 43 is a dual sensing system with left and right respective earphones 45, 45' connected thereto. In addition, the receiver 43 comprises means for distinguishing the direction and distance of the incoming signal, such that, when a signal is detected, the receiver relays the information to each earphone via an audible notifier, as described above. The notifier will be different in each earphone, if the user is not directly facing the transmitter on the object to be located. However, when the user is directly facing the transmitter, the receiver may send either a distinguished notifier to both earphones, different in pitch or volume from previous notifiers, or a notifier that is equal in sound in each earphone.

Figure 5:
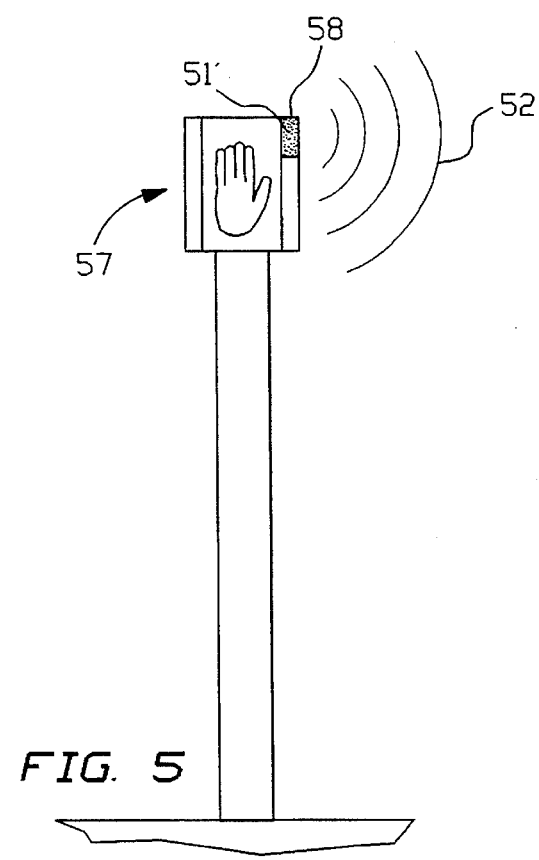
FIG. 5 shows a plan view of a transmitter unit of the present invention attached to an object.

Referring now to FIG. 5, there is shown the transmitter 51 having means for being mountable 58 to a traffic sign. In operation, the transmitter 51 functions with a receiver as described herein. The transmitter has the capability of additionally sending out a coded message, such as "don't walk" as previously described.

Figure 6A:
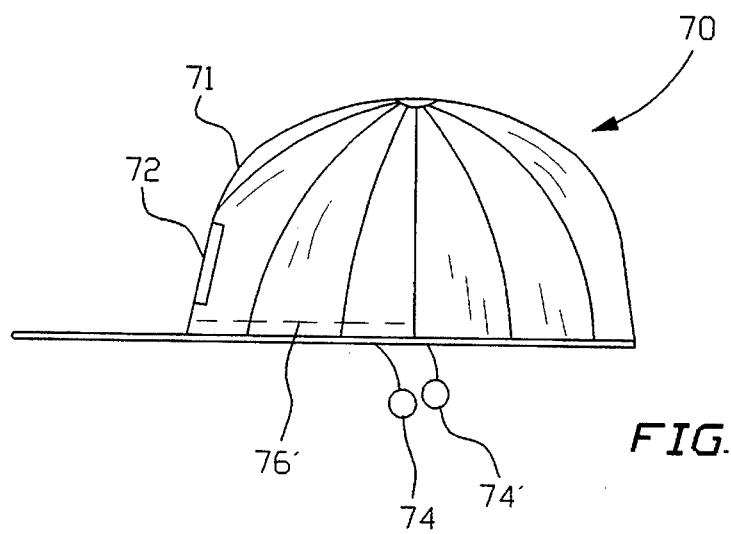
FIG. 6a shows a side view of a receiver unit of the present invention.
Figure 6B:
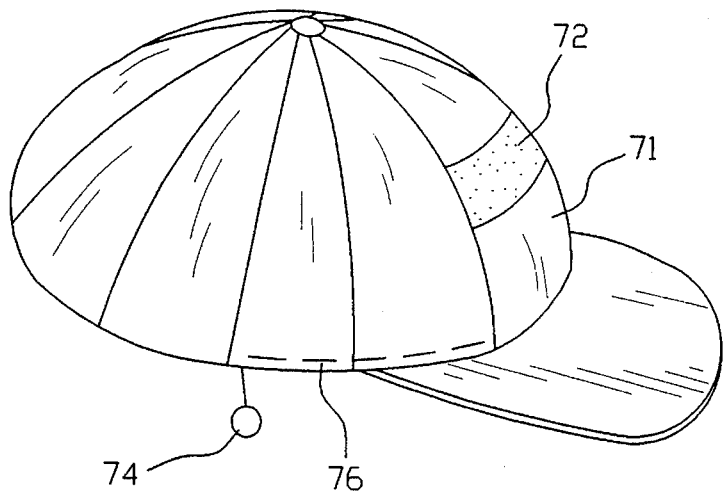

In addition to the receiver unit of FIG. 4 there can be a variety of other unit means to be worn by the user for housing the receiver. Referring now to FIGS. 6a and 6b, there is depicted a receiver unit in the form of a hat 70. In this embodiment, the receiver 72 is incorporated into the front panel 71 of the hat 70. The information from the receiver 72 travels to the respective earphones 74, 74' via transmission lines (discrete wires) 76, 76'.

Figure 7:
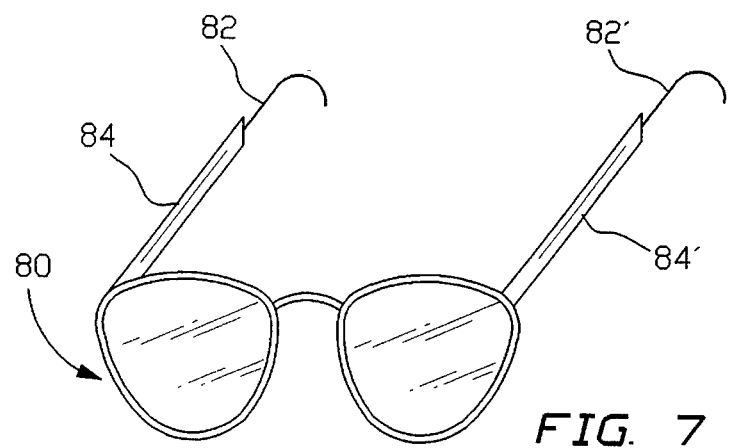
FIG. 7 shows a perspective view of an alternative embodiment of the receiver unit of the present invention.

Alternatively, there could be two receiving units as shown in FIG. 7. In this embodiment, there is a first receiver 84 attached to one side 82 of a pair of glasses 80 and a second receiver 84' attached to the opposite side 82'. These receivers function separately to track a signal, such that when a signal is coming from the left hand side of the user, the receiver on the left hand side will sound a more pronounced audible notifier than the receiver on the right side. In this manner, when the user is directly facing the object, the audible notifier from both receivers will be the same.

The two receiving units could comprise two separate receivers that feed into the respective earphones. Thus, the receivers could each be provided with a sensor, and other components of the receiver system as described in FIG. 2, that could distinguish from which direction and at what distance the signal is coming.

Although the receiving units of the present invention have been shown to be worn on the user's head, the main receiving unit could be easily housed in the user's pocket or attached to a belt buckle with only a wired pair of earphones being worn on the user's head.

It should further be understood that the invention as described above can be used in a multitude of settings. For instance, a plurality of transmitting devices could be placed on various objects in the home. The signals could be set with specified frequencies or standardized code patterns that would be synonymous with a particular chair, drawer, the bathroom, the radio, or other such objects.

The receiver system of the present invention could also include a volume control. It should be of automatic control so that it is capable of taking the transmitted information, determining distance and sounding the audible notifiers accordingly.

Much in the same way that people receive audio and video signals and process them with the brain, the device of the present invention is capable of receiving a handful of signals and messages that are interpreted by a user of the device of the present invention as described herein.

Obviously, numerous modifications and variations of the present invention are possible in light of the above teachings. It is therefore understood that within the scope of the appended claims, the invention may be practiced otherwise than as specifically described herein.

What is claimed is:

1. A device for guiding the visually impaired comprising:
    (a) a transmitting unit including means for transmitting an inaudible signal, said transmitting unit being mountable to a desired object, and
    (b) a receiving unit, said receiving unit being attached to a housing unit to be worn by a user, and including means for receiving said signal in connection with means for processing, said means for processing being further in connection with means for amplifying and broadcasting;
    wherein said means for processing comprises distance calculator means for determining a distance between said transmitting unit and said receiving unit, direction discriminator means for sensing a direction of the transmitted signal, and source decoder means for decoding a message;
    said means for processing further comprising an information discriminator and source generator in electrical connection with said distance calculator means, direction discriminator means and source decoder means; said information discriminator and source generator having means for generating a first and second audible notifier associated with said distance, said direction and said message; and
    said means for amplifying and broadcasting having means for sounding said first and second audible notifiers, said first and second audible notifiers being associated with an identification and a location of said transmitting unit on said desired object such that said first and second audible notifiers are different unless the receiving unit is faced directly in front of the transmitting unit.

2. The device of claim 1, wherein said means for amplifying and broadcasting comprises a set of earphones.

3. The device of claim 1, wherein said information discriminator and source generator includes programmed means for prioritizing predetermined information.

4. The device of claim 3, wherein said programmed means is a microprocessing chip.

5. The device of claim 1, wherein said transmitter unit further comprises programmed means for prioritizing predetermined information.

6. The device of claim 5, wherein said programmed means is a microprocessing chip or an encoder.

7. The device of claim 1, further comprising means for attaching said transmitting unit to said desired object, said means for attaching being selected from the group consisting of adhesive, hook and loop type fasteners, screws and rivets.

8. The device of claim 1, wherein said inaudible signal is selected from the group consisting of RF signals and ultrasonic signals.

9. The device of claim 1, wherein said housing unit is selected from the group consisting of a pair of glasses and a hat.

10. A device for guiding the visually impaired comprising,
    (a) a transmitting unit including means for transmitting an inaudible signal, said transmitting unit being mountable to a desired object, and
    (b) a receiving unit, said receiving unit being attached to a housing unit to be worn on a head of a user, and including means for receiving said signal in connection with means for processing, said means for processing being further in connection with means for amplifying and broadcasting;
    wherein said means for processing comprises distance calculator means for determining a distance between said transmitting unit and said receiving unit, direction discriminator means for sensing a direction of the transmitted signal, and source decoder means for decoding a message;
    said means for processing further comprising an information discriminator and source generator in electrical connection with said distance calculator means, direction discriminator means and source decoder means; said information discriminator and source generator having means for generating a first and second audible notifier associated with said distance, said direction and said message; and
    said means for amplifying and broadcasting comprising a controller, amplifier and left and right earphones for sounding said first and second audible notifiers, said first and second audible notifiers being associated with an identification and a location of said transmitting unit on said desired object such that said first and second audible notifiers are different unless the receiving unit is faced directly in front of the transmitting unit.

11. The device of claim 10, wherein said information discriminator and source generator includes programmed means for prioritizing predetermined information.

12. The device of claim 11, wherein said programmed means is a microprocessing chip.

13. The device of claim 10, wherein said transmitter unit further comprises programmed means for prioritizing predetermined information.

14. The device of claim 13, wherein said programmed means is a microprocessing chip or an encoder.

15. The device of claim 10, further comprising means for attaching said transmitting unit to said desired object, said means for attaching being selected from the group consisting of adhesive, hook and loop type fasteners, screws and rivets.

16. The device of claim 10, wherein said inaudible signal is selected from the group consisting of RF signals and ultrasonic signals.

17. The device of claim 10, wherein said housing unit is selected from the group consisting of a pair of glasses and a hat.

18. A device for guiding the visually impaired comprising,
    (a) a transmitting unit including means for transmitting an inaudible signal, said transmitting unit being mountable to a desired object, and
    (b) a receiving unit, said receiving unit being attached to a housing unit to be worn on a head of a user, and including means for receiving said signal in connection with means for processing, said means for processing being further in connection with means for amplifying and broadcasting;
    wherein said means for processing comprises distance calculator means for determining a distance between said transmitting unit and said receiving unit, direction discriminator means for sensing a direction of the transmitted signal, and source decoder means for decoding a message;
    said means for processing further comprising an information discriminator and source generator in electrical connection with said distance calculator means, direction discriminator means and source decoder means; said information discriminator and source generator having programmed means for prioritizing predetermined information and means for generating a first and second audible notifier associated with said distance, said direction, said message and said predetermined information; and said means for amplifying and broadcasting comprising a controller, amplifier and left and right earphones for sounding said first and second audible notifiers, said first and second audible notifiers being associated with an identification and a location of said transmitting unit on said desired object such that said first and second audible notifiers are different unless the receiving unit is faced directly in front of the transmitting unit.

19. The device of claim 18, wherein said inaudible signal is selected from the group consisting of RF signals and ultrasonic signals.

20. The device of claim 18, wherein said housing unit is selected from the group consisting of a pair of glasses and a hat.

* * * * *